Sept. 10, 1929.   W. J. ANDRES   1,727,923
BRAKE
Filed June 20, 1927

INVENTOR
WILLIAM J. ANDRES
BY
ATTORNEY

Patented Sept. 10, 1929.

1,727,923

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed June 20, 1927. Serial No. 199,970.

This invention relates to brakes and is illustrated as embodied in an internal expanding automobile brake. An object of the invention is to provide for inter-engagement of the shoes or other friction means of the brake, to prevent lateral movement thereof, with a pair of applying devices such as cams which are shiftably mounted on an operating shaft so that they balance their pressures automatically between the two ends. In the arrangement shown in the brakes there are thrust rollers arranged on opposite sides of said ends in engagement with the cams. I prefer to flatten a portion of the shaft and to provide the cams with slots embracing the flattened portion of the shaft, so that the cams may shift without interfering with their angular movement when the shaft is rotated.

Figure 1:
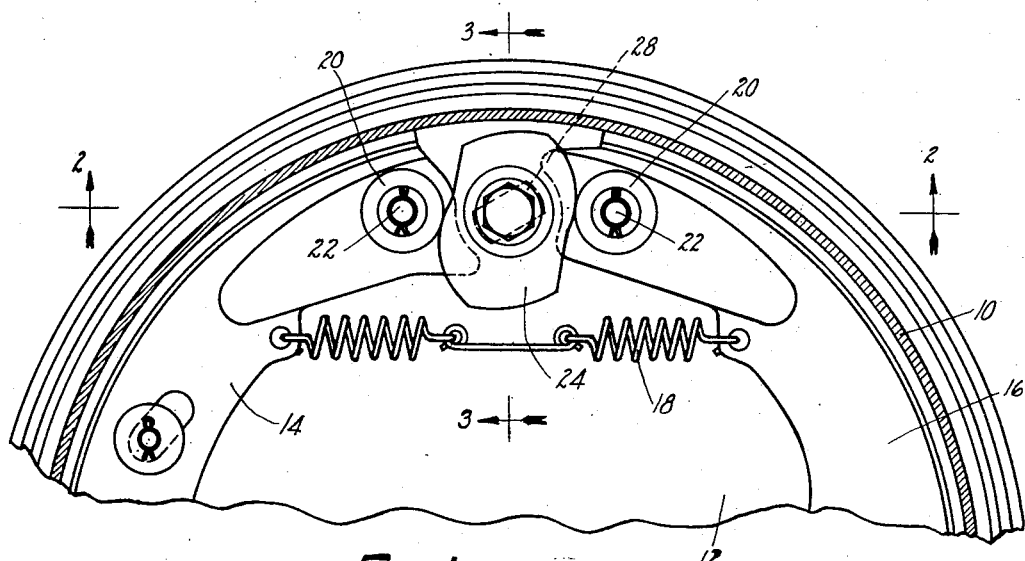
Figure 3:
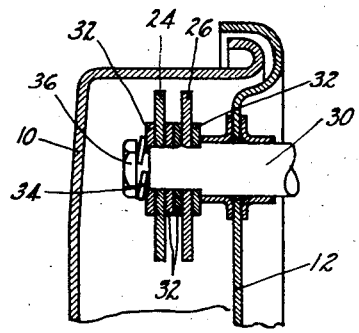
Figure 2:
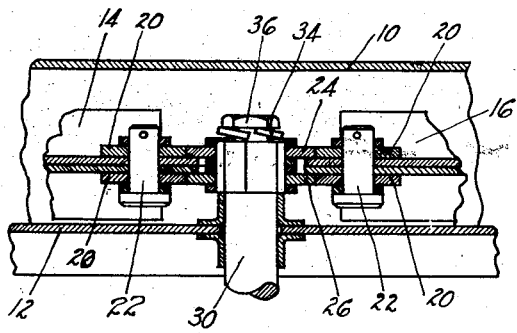

The above and other objects and features of the invention, including various novel and desirable structural details, will be apparent from the following description of the illustrative embodiment shown in the accompanying drawing, in which:

Figure 1 is a vertical section through the upper part of the brake, just inside the head of the brake drum, showing the brake shoes in side elevation;

Figure 2 is a partial section through the applying means on the line 2—2 of Figure 1; and Figure 3 is a partial section on the line 3—3 of Figures 1 and 2, showing the brake-applying means.

The brake selected for illustration includes a rotatable drum 10 at the open side of which is a stationary support such as a backing plate 12, and within which is arranged the friction means of the brake, illustrated as including shoes 14 and 16, urged away from the drum toward idle position by means such as a return spring 18.

At their adjacent ends, the shoes 14 and 16 or their equivalents are preferably provided on opposite sides with thrust rollers 20, pivoted on spindles 22, and engaged by a pair of shiftable applying devices such as stamped cams 24 and 26 arranged to embrace the ends of the shoes between them to prevent them from moving laterally. The cams 24 and 26 are provided with slots 28 to embrace a flattened portion of a cam shaft 30, so that the cams may balance themselves between the two shoes in case of unequal wear.

In the arrangement illustrated, the cams 24 and 26, or equivalent applying devices, are assembled on the shaft 30 with suitable spacing washers 32 held by a resilient snap ring 34 in a groove in the end of the shaft. If desired, the snap ring may serve as a lock washer and in that case the groove is formed by threading into the end of the shaft a cap screw 36. By tightening up on the cap screw 36 more or less pressure may be applied through the lock washer 34 through the assembly of washers and cams so that the cams are frictionally held against shifting except when uneven wear of the brake shoes makes the shifting necessary.

While one illustrative embodiment has been described in detail, it is not my intention to limit the scope of the invention to that particular embodiment or otherwise than by the terms of the appended claims.

I claim:

1. A brake including friction means having adjacent separable ends provided with thrust members on their opposite sides, in combination with a shaft between said ends and a pair of applying devices individually shiftably mounted directly on said shaft and embracing the ends of the friction means to prevent lateral movement and operatively engaging the thrust members.

2. A brake including friction means having adjacent ends, in combination with a shaft having individually-shiftable applying devices directly mounted on the shaft and acting on said ends to apply the brake and also embracing said ends between them.

3. A brake including friction means having adjacent ends, in combination with a shaft having a flattened portion and a pair of applying devices slotted and individually shiftably mounted on said flattened portion of the shaft and acting on said ends to apply the brake and also embracing said ends between them.

4. A brake including friction means having adjacent ends, in combination with a shaft having a flattened portion and a pair of applying devices slotted and individually shiftably mounted on said flattened portion of the shaft and acting on said ends to apply the brake.

5. A brake including friction means having adjacent ends provided with thrust rollers on their opposite sides, in combination with a shaft having a pair of individually mounted applying devices shiftably mounted thereon and engaging said rollers and embracing said ends between them.

6. A brake-applying device including a shaft having a flattened portion, in combination with a pair of applying devices slotted to embrace said flattened portion of the shaft and spacing washers encircling the shaft between the applying devices.

7. A brake-applying device including a shaft having a flattened portion, in combination with a pair of applying devices slotted to embrace said flattened portion of the shaft and means for yieldingly resisting shifting of said devices on the shaft, said means including a cap screw threaded into the end of the shaft and a spring compressed by the cap screw.

8. A brake comprising friction means having adjacent separable ends, in combination with a shaft having individually shiftable applying devices mounted directly thereupon between the separable ends of said friction means to rotate with the shaft to actuate said ends but automatically slidably shiftable over the shaft.

9. A brake comprising friction means having adjacent separable ends in combination with a shaft having a non-circular portion and two separate and distinct cam members mounted upon said non-circular portion of the shaft to rotate therewith to actuate said friction means but automatically shiftable over said non-circular portion of the shaft.

In testimony whereof, I have hereunto signed my name.

WILLIAM J. ANDRES.